United States Patent
Manroa et al.

(10) Patent No.: US 8,873,541 B1
(45) Date of Patent: Oct. 28, 2014

(54) SYSTEM AND METHOD FOR ON-DUTY COMMUNICATION

(75) Inventors: Arun Manroa, Herndon, VA (US);
Zheng Cai, Fairfax, VA (US)

(73) Assignee: Nextel Communications Inc., Reston, VA (US)

(*) Notice: Subject to any disclaimer, the term of this patent is extended or adjusted under 35 U.S.C. 154(b) by 1975 days.

(21) Appl. No.: 11/947,626

(22) Filed: Nov. 29, 2007

(51) Int. Cl.
*H04L 12/66* (2006.01)
*H04M 3/42* (2006.01)
*H04W 40/00* (2009.01)

(52) U.S. Cl.
USPC ... 370/352; 455/414.1; 455/445; 379/211.02; 379/211.03; 379/211.04

(58) Field of Classification Search
CPC ....... H04W 76/005; H04W 4/10; H04W 4/06; H04W 4/08; H04W 76/02; H04M 3/42229; H04M 3/54; H04M 3/436; H04M 2207/12; H04M 3/46; H04M 3/465
USPC ............ 370/352; 455/456.1, 414.1, 445, 518; 379/211.02–211.04
See application file for complete search history.

(56) References Cited

U.S. PATENT DOCUMENTS

| | | | | |
|---|---|---|---|---|
| 6,473,501 B1* | 10/2002 | Paulsrud | ........................ | 379/157 |
| 6,829,341 B2* | 12/2004 | Contreras | ..................... | 379/177 |
| 6,895,254 B2* | 5/2005 | Dorenbosch | .................. | 455/518 |
| 2004/0082352 A1* | 4/2004 | Keating et al. | ................ | 455/519 |
| 2005/0255871 A1* | 11/2005 | Saeed et al. | .................... | 455/518 |
| 2006/0141961 A1* | 6/2006 | Schentrup et al. | ............ | 455/133 |
| 2006/0148503 A1* | 7/2006 | Lasisi et al. | ................... | 455/518 |
| 2008/0005232 A1* | 1/2008 | Feng | ............................ | 709/204 |
| 2008/0084990 A1* | 4/2008 | Vincent et al. | ................ | 379/354 |

\* cited by examiner

*Primary Examiner* — Nicholas Jensen

(57) ABSTRACT

Systems and methods are provided for establishing a communication session. A communication setup request with a service address may be received by a communication server from a first communication device. At least two communication devices associated with the service address may be identified. The communication server may transmit a call setup request to the at least two communication devices. A communication session can be established exclusively between the first communication device and a first one of the at least two communication devices that responds to the call setup request.

9 Claims, 6 Drawing Sheets

SYSTEM AND METHOD FOR ON-DUTY COMMUNICATION

BACKGROUND OF THE INVENTION

Communication networks typically provide either one-to-one calls or group calls. One-to-one calls typically involve identifying a single terminating communication device based on a specific communication address, while group calls involve identifying more than one terminating communication device based on the specific communication address. Call centers employ one-to-one calls in which a specific communication address is received by a call distributor, which then identifies an available communication device, and sends the call only to the available communication device. A group call is established between the calling communication device and every terminating communication device that responds to a call setup request.

SUMMARY OF THE INVENTION

It has been recognized that conventional one-to-one and groups calls have a number of deficiencies, which are addressed by the present invention. In accordance with exemplary embodiments of the present invention, a single communication address can be used to contact a number of terminating communication devices, and a communication session is established exclusively between the calling communication device and the first terminating communication device that responds to the call setup message.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
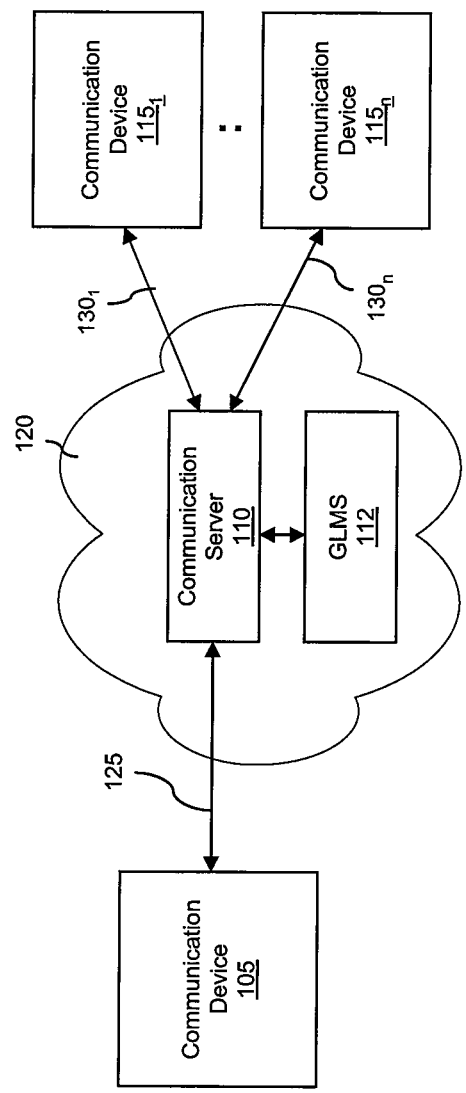
FIG. 1 is a simplified block diagram of a system in accordance with the present invention.

Referring now to the figures, FIG. 1 is a simplified system diagram of an exemplary communication system in accordance with the present invention. As illustrated, communication network 120 may include a communication server 110 to support a communication session between communication device 105 and communication devices $115_{1-n}$, over communication links 125 and $130_{1-n}$, respectively. The network can also include a group list management server (GLMS) 112, or the functions of GLMS 112 may be incorporated into communication server 110. Communication devices 105 and $115_{1-n}$ can be any type of wireless and/or wired communication device, supporting any type of communications, such as voice dispatch, voice interconnect, text, video and/or the like. As such, media streams of a communication session between communication devices 105 and $115_{1-n}$ may be carried over communication links 125 and $130_{1-n}$. It should be appreciated that media streams may be based on any wired and/or wireless based standard (e.g., Pulse Code Modulation (PCM), Global System for Mobile Communications (GSM), Code Division Multiple Access (CDMA), etc.). Similarly, communications supported by communication network 120 may be either wireless, wireline or a combination thereof. According to another embodiment, media streams may be one or more of voice, text, video and communication data in general.

In accordance with exemplary embodiments of the present invention, the plurality of communication devices $115_{1-n}$ are associated with the same service address. The service address may be a fixed network identifier, such as a directory number, a Push-to-Talk (PTT) identifier, an Internet Protocol (IP) address, or the like. The service address is recognized by communication server 110 for establishing a communication session with one of the communication devices associated with the address as described below in more detail with reference to FIGS. 3A, 3B, 4A and 4B.

In accordance with exemplary embodiments of the present invention, a service address may be associated with communication devices considered on-duty. As used herein, an on-duty device may refer to at least one communication device (e.g., communications devices $115_{1-n}$) assigned for receiving communication invitations, such as call setup requests during particular periods of time. A business or organization may utilize a service address as a point of contact, wherein the service address is assigned to different groups of communications devices during different periods of time.

A service address can also be assigned to a call center, such that communication requests for the service address may be provided to the call center for routing the call to at least one calling agent associated with at least one communication device (e.g., communication devices $115_{1-n}$). It may be appreciated that call agents may provide support and/or customer service. In that fashion, communication server 110 can establish a communication session between a first communication device (e.g., communication device 105) and a call agent associated with a service address.

GLMS 112 stores communication station identifiers, such as PTT addresses, and an association with one or more service addresses. GLMS 112 also stores service association data for communication sessions supported by communication server 110. The service association data may include data corresponding to network identifiers for communication devices of a communication session and a record of the time the communication session occurred and this data can be used to reconnect communication stations when a call ends either by user termination, a dropped call or hang timer expiration. Communication server 110 can include a service association timer for establishing a time period the service association data is stored.

Figure 2:
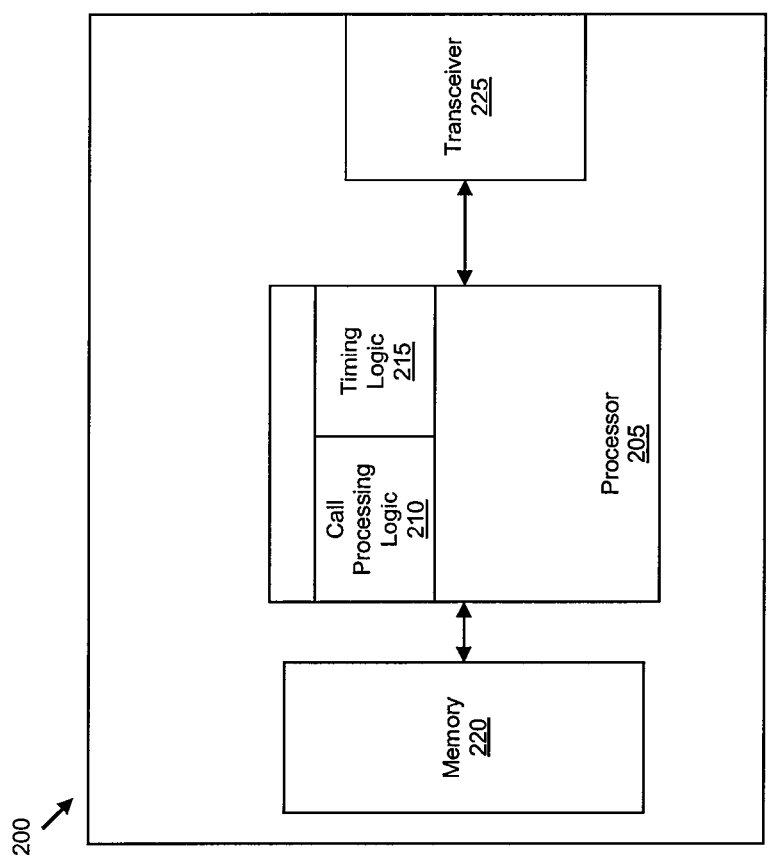
FIG. 2 is a block diagram of an exemplary communication server in accordance with the present invention.

Referring now to FIG. 2, a block diagram of an exemplary communication server 200 is shown in accordance with the present invention. As shown, communication server 200 includes a processor 205 coupled to memory 220 and transceiver 225. Processor 205 includes call processing logic 210 and timing logic 215, which will be described in more detail below in connection with FIGS. 3A, 3B, 4A and 4B, and can be any type of processor, such as a microprocessor, field programmable gate array (FPGA) and/or application specific integrated circuit (ASIC). When processor 205 is a microprocessor then logic 210 and 215 can be processor-executable code loaded from memory 205. As such, communication server 200 may be configured to operate with the communications network as described in FIG. 1.

Figure 3A:
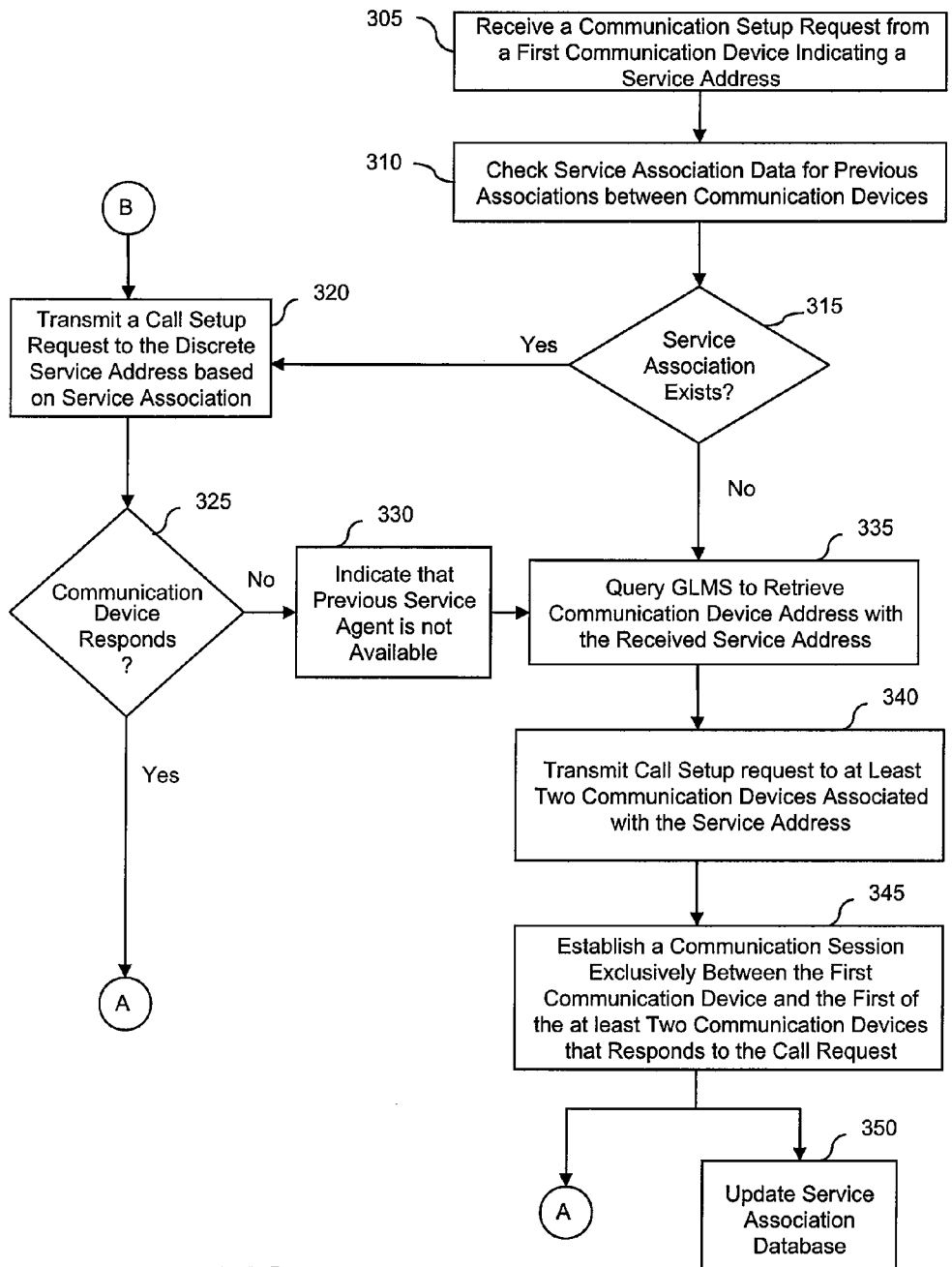
FIGS. 3A-3B are flow diagrams of an exemplary method in accordance with the present invention.
Figure 3B:
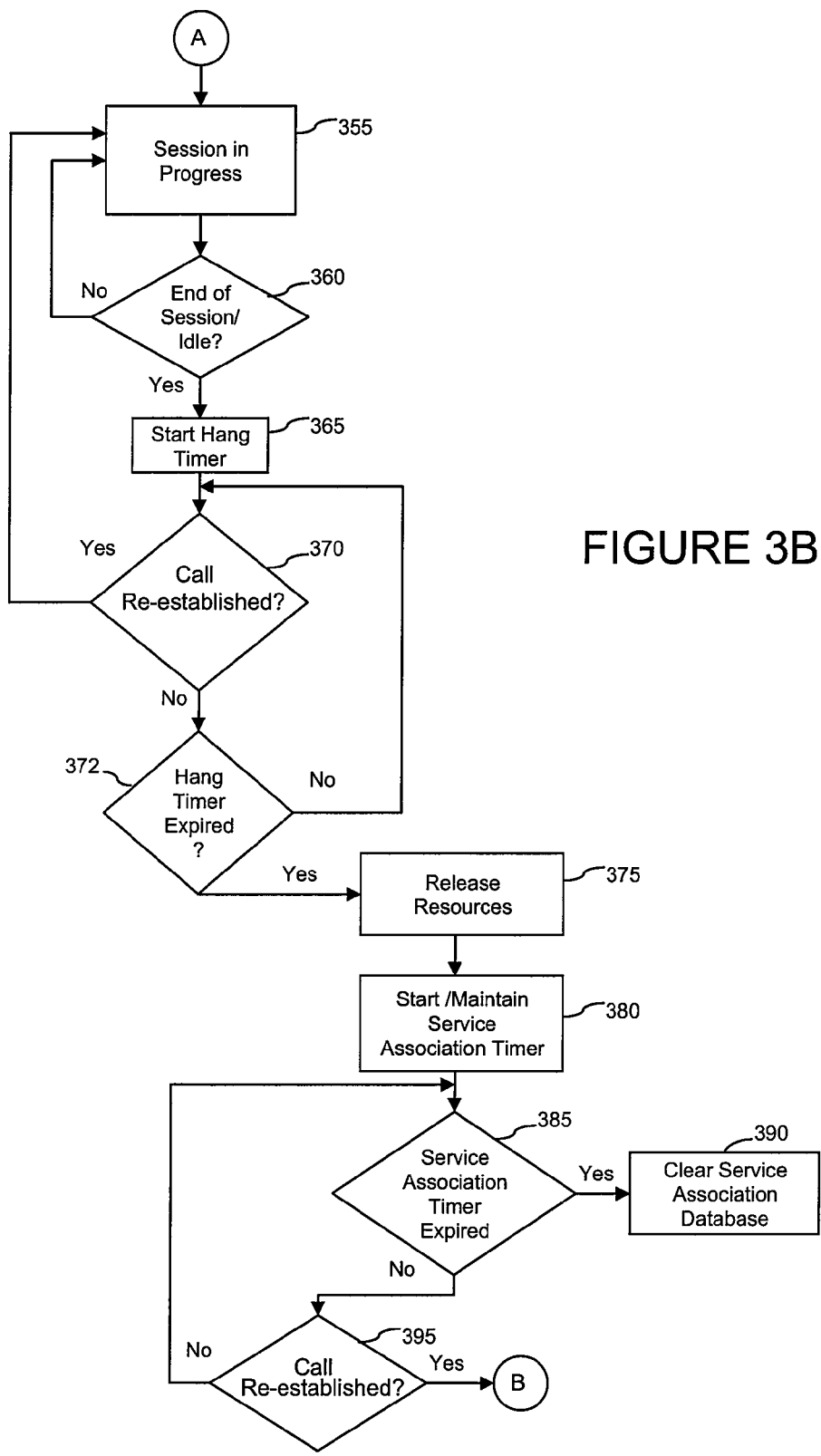

FIGS. 3A-3B are flow diagrams of an exemplary method of establishing a communication session, in accordance with the present invention. Referring first to FIG. 3A, call processing logic 210 of a communication server (e.g., communication server 110) receives a request for a communication session from a first communication device, via transceiver 225, indicating a destination service address (step 305). The request may be provided as a PTT protocol message, a Session Initiation Protocol (SIP) Invite message and a message formatted according to iDEN® and/or high performance push-to-talk (HPPTT) protocols.

Call processing logic 210 processes the call request and checks for service association data related to the first communication device (step 310). Service association data may exist for previous communication sessions initiated by the first communication device with the service address. Call processing logic 210 can retrieve service association data from group list management server 112 and/or an internal database. It may be appreciated that service association data can include network identifiers for first and second communication devices, a service address and/or start time and duration of a communication session. Further, call processing logic can determine if a service association exists between the first communication device and the service address (step 315). When a service association exists ("Yes" path out of decision step 315), call processing logic 210 transmits a call setup request message to a target communication device (e.g., communication device $115_{1-n}$) as indicated by the service association data (step 320).

Call processing logic 210 then determines whether a response is received from the target communication device (step 325). When the target communication device does not respond ("No" path out of decision step 325) call processing logic 210 can provide an indication to the first communication device that a previous service agent is not available (step 330). When a service association does not exist ("No" path out of decision step 315) or after providing an indication that the previous service agent is not available (step 330), call processing logic 210 queries GLMS 112 to identify at least two communication devices associated with the service address (step 335).

Call processing logic 210 transmits a call setup request to each communication device associated with the service address (step 340). It may also be appreciated that the call setup request can be transmitted to only a portion of the communication devices associated with the service address such as, on-duty devices associated with the service address during a particular period of time.

Call processing logic 210 of the communication server establishes a communication session exclusively between the first communication device and a first one of the at least two communication devices that responds to the call setup request (step 345). Call processing logic 210 can transmit call rejection messages to the second of the at least two communication devices after receiving a call accept message as described below in more detail with respect to FIGS. 4A-4B below. Following, the establishment of a communication session, call processing logic 210 generates and stores service association data for the communication session (step 350).

Referring now to FIG. 3B, when the communication device responds ("Yes" path out of the decision step 325) or after the exclusive communication session has been established (step 345), call processing logic 210 supports the established communication session (step 355). Call processing logic 210 can determine if the communication session has ended or if the communication session is idle (step 360). For example, the communication session can end if a user terminates the session using a communication device (e.g., communication devices 105 or $115_{1-n}$) or due to a dropped call. Similarly, the communication session can enter an idle state if media is not transmitted to either device for a predetermined period of time. When call processing logic 210 determines the communication session has not ended nor entered an idle state ("No" path out of decision step 360), call processing logic 210 can continue to support the communication session (step 355). When call processing logic 210 determines the communication session has ended and/or entered an idle state ("Yes" path out of decision step 360) timing logic 215 can start a hang timer (step 365). As will be recognized by those skilled in the art, a hang timer is used for maintaining communication resources when the communication session is idle.

Thus, when the call is re-established ("Yes" path out of decision step 370), then the method returns to step 355. When the call is not re-established, ("No" path out of decision step 370), then it is determined whether the hang timer has expired (step 372). When the hang timer has not expired ("No" path out of decision step 372), then call processing logic determines whether the call is re-established (step 370). If the hang timer has expired ("Yes" path out of decision step 372), then call processing logic 210 can release the communication resources (step 375).

When the hang timer has expired ("Yes" path out of decision step 372) and call processing logic 210 has released the communication resources (step 375), timing logic 215 can start a service association timer (step 380). Timing of service association, by timing logic 215, may be executed by a processor (e.g., processor 205). It may be appreciated that service association time, as measured by timing logic 215, can correspond to a predetermined period of time wherein call processing logic 210 maintains an association between the calling and called communication devices. The service association data and timer allow the first communication device to be reconnected to the first one of the target communication devices that responds to the call request, without any specific action required by either communication device. This is particularly useful because the user of the first communication device may be disconnected from the first communication device that responds to the call request (e.g., when the call ends either by user termination, a dropped call or hang timer expiration), but will want to speak with the same person that was part of the previous call. For example, when the target communication devices are associated with a call center, the user will likely want to continue speaking with the same service agent, but will only have the service address available. Accordingly, the user of the first communication device need not have the actual network identifier for the first one of the target communication devices that responds to the call request. Instead, the user of the first communication device can reestablish the call session simply by calling the service address again.

When the service association timer has expired ("Yes" path out of decision step 385), call processing logic 210 clears the service association between the calling and called communication devices (step 390). When the service association timer has not expired ("No" path out of decision step 385), then call processing logic determines whether the call is re-established (step 395). Thus, when the call is re-established ("Yes" path out of decision step 395), the method returns to step 320. When the call is not re-established, ("No" path out of decision step 370), then it is determined whether the service association timer has expired (step 385). It may be appreciated that call processing logic 210 can maintain a service association for a predetermined period of time. As such, a user of a first communication device (e.g., communication device 105) can re-establish a communication session with a particular service agent associated with a service address even after the communication session has been torn down.

Figure 4A:
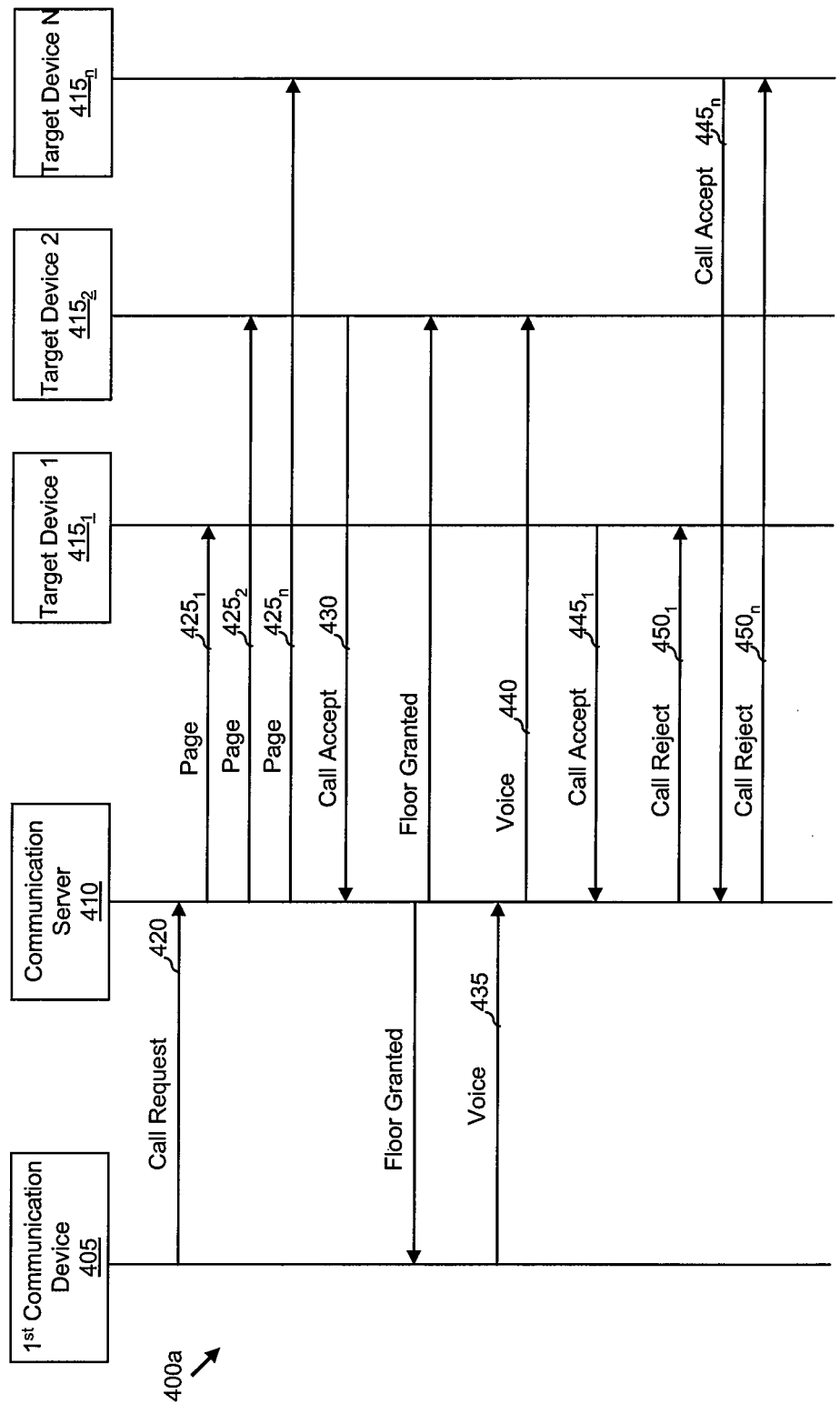
FIGS. 4A-4B are call flow diagrams of exemplary methods in accordance with the present invention.
Figure 4B:
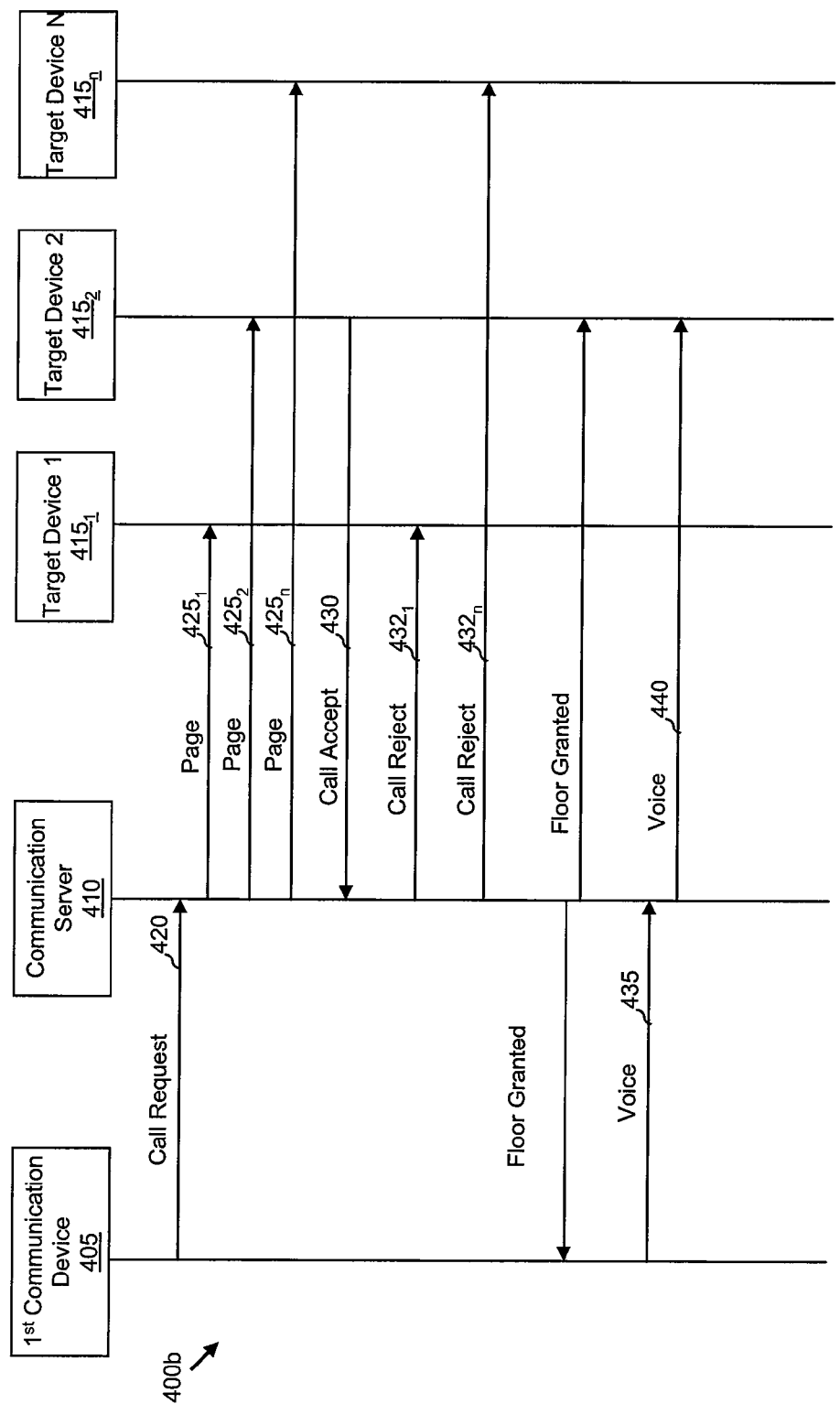

FIGS. 4A-4B illustrate call setup procedures 400a-400b of exemplary methods of establishing a communication session in accordance with the present invention. Referring first to FIG. 4A, call set up procedure 400a can be initiated when a first communication device 405 (e.g., communication device 105) transmits a call request message 420 with a destination service address. Communication sever 410 receives call request 420 and processes the request to identify communication devices associated with the service address. Identification of communication devices associated with the service address can include communication server 410 checking for service association data as described above with reference to FIGS. 3A and 3B. In the call flow of FIG. 4A, a service association does not exist between the first communication device 405 and the service address. Accordingly, communication server 410 transmits call request pages $425_{1-n}$ to at least two of the target communication devices $415_{1-n}$. The first target device that responds to the call request page is part of an exclusive communication session with the calling communication device. As shown in FIG. 4A, target device $415_2$ transmits call accept message 430 to communication server 410. Although not shown in FIG. 4A, when a service association exists between the first communication device 405 and the service address, communication server 410 transmits a call setup request to a target communication device indicated by service association data.

In certain embodiments, communication sever 410 can process call request 420 and transmit call request pages $425_{1-n}$ serially to at least one of the target communication devices $415_{1-n}$. For example, communication server 410 can transmit a first call request page $425_1$ to a first target communication device $415_1$, and then wait a predetermined period of time to transmit a second, call request page $425_2$ to a second target communication device $415_2$. According to another embodiment, call request pages $425_{1-n}$ may be transmitted simultaneously.

In response to the call accept message 430, communication server 410 establishes a communication session exclusively between the first communication device 405 and target communication device $415_2$. Following acceptance of a call request, communication server 410 can grant control of the floor to the first communication device 405 or target communication device $415_2$, and communication server 410 updates an entry of the service association database. The first communication device 405 may then transmit media message 435, such as voice communication, to communication server 410. Communication server 410 transmits media message 440 to second communication device $415_2$. It may also be appreciated that device $415_2$ can initiate transmission of a media message to the first communication device 405 after receiving floor arbitration messages that grant the second communication device $415_2$ control of the floor.

If communication server 410 receives additional messages accepting call invitations $425_{1-n}$ from any of the target communication device $415_{1-n}$, after the exclusive communication session is established, communication server 410 may then transmit call reject messages $450_{1-n}$ to each target device in response to receipt of these subsequent call accept messages.

FIG. 4B illustrates an alternate method of notifying communication devices that an exclusive communication session has been established. Specifically, after the first call accept message 430 is received by communication server 410, the server sends a call rejection message $432_{1-n}$ to the additional communication devices ($415_1$ and $415_n$) offered a call request page. In that fashion, communication sever 410 can establish a communication session exclusively between the first communication device 405 and a first communication device that responds to the call setup request (e.g., communication device $415_2$). Similar to the call flow of FIG. 4A, a service association does not exist between the first communication device 405 and the service address in the call flow of FIG. 4B.

Although call setup procedures 400a-400b have been described in accordance with a push-to-talk communication sessions, it may be appreciated that call setup procedures 400a-400b may be applied to one of a Voice Over Internet Protocol (VOIP) communications and voice communications systems in general. While the process of call set up procedure has been described for a single communication device with a service address, it may be appreciated that that communication server can establish a group communication session between multiple communications devices and a service address.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for establishing a push-to-talk communication session, the method comprising:
   receiving, by a communication server from a first communication device, a first push-to-talk communication setup request with a service address, wherein the service address comprises a push-to-talk identifier;
   identifying a second communication device, a third communication device, and a fourth communication device associated with the service address;
   transmitting, by the communication server, a first push-to-talk call setup request to the second communication device, the third communication device, and the fourth communication device;
   receiving, by the communication server, a first push-to-talk call setup response from the second communication device and a second push-to-talk call setup response from the third communication device;
   establishing a first push-to-talk communication session exclusively between the first communication device and the second communication device when the communication server receives the first push-to-talk setup response from the second communication device before receiving the second push-to-talk call setup response from the third communication device;
   transmitting, by the communication server to the fourth communication device, a notification that the first push-to-talk communication session has been established exclusively between the first communication device and the second communication device when a push-to-talk setup response is not received from the fourth communication device;
   receiving, by the communication server from the first communication device, a second push-to-talk communication setup request with the service address after the first push-to-talk communication session is terminated; and
   transmitting, by the communication server, a second push-to-talk call setup request to the second communication device and establishing a second push-to-talk communication session exclusively between the first communication device and the second communication device, in response to the second push-to-talk communication setup request.

2. The method of claim 1, further comprising:
transmitting a call rejection message to the third communication device after the communication server receives the second push-to-talk setup response.

3. The method of claim 1, further comprising:
determining, by the communication server, whether the first push-to-talk communication session has been idle;
determining, by the communication server, whether a hang timer has expired; and
starting a service association timer when the hang timer has expired.

4. The method of claim 1, further comprising:
determining, by the communication server, whether a hang timer has expired with respect to the first push-to-talk communication session, wherein the terminating of the first push-to-talk communication session is based on whether the hang timer has expired;
maintaining an association between the first communication device and the second communication device, when terminating the first push-to-talk communication session; and
determining, by the communication server, whether a service association timer has expired with respect to the first push-to-talk communication session,
wherein the transmitting, by the communication server, of the second call setup request to the second communication device and the establishing of the second push-to-talk communication session exclusively between the first communication device and the second communication device is based on whether the service association timer has not expired.

5. A communication server, comprising:
call processing logic configured to:
receive a first push-to-talk communication setup request with a service address from a first communication device, wherein the service address comprises a push-to-talk identifier;
identify a second communication device, a third communication device, and a fourth communication device associated with the service address;
transmit a first push-to-talk call setup request to the second communication device, the third communication device, and the fourth communication device;
receive a first push-to-talk call setup response from the second communication device and a second push-to-talk call setup response from the third communication device; and
establish a first communication session exclusively between the first communication device and the second communication device when the first push-to-talk call setup response is received before the second push-to-talk call setup response;
transmit to the fourth communication device a notification that the first push-to-talk communication session has been established exclusively between the first communication device and the second communication device when a push-to-talk setup response is not received from the fourth communication device;
receive a second push-to-talk communication setup request with the service address from the first communication device after the first push-to-talk communication session is terminated; and
transmit a second push-to-talk call setup request to the second communication device and establish a second push-to-talk communication session exclusively between the first communication device and the second communication device, in response to the second push-to-talk communication setup request.

6. The communication server of claim 5, wherein the call processing logic is further configured to:
transmit a call rejection message to the third communication device after the second push-to-talk setup response is received.

7. The communication server of claim 5, further comprising:
timing logic that determines whether the first push-to-talk communication session has been idle;
determines whether hang timer has expired; and
starts the service association timer when the hang timer has expired.

8. The communication server of claim 5, further comprising:
timing logic that determines whether a hang timer has expired with respect to the first push-to-talk communication session, wherein the terminating of the first push-to-talk communication session is based on whether the hang timer has expired and whether a service association timer expired with respect to the first push-to-talk communication session, wherein the terminating of the first push-to-talk communication session is based on whether the hang timer has expired, wherein the processing logic is further configured to:
tear down the first push-to-talk communication session, while maintaining an association between the first communication device and the second communication device, when the hang timer has expired; and
establish the second push-to-talk communication session between the first communication device and the second communication device, when receiving the second push-to-talk communication setup request and the service association timer has not expired.

9. The communication server of claim 8, wherein when the service association timer has expired, the processing logic configured to:
transmit another call setup request to the second communication device, the third communication device, and the fourth communication device; and
establish another push-to-talk communication session exclusively between the first communication device and one of the second communication device, the third communication device, and the fourth communication device, wherein the second communication device, the third communication device, and the fourth communication device is selected based on when a push-to-talk call setup response is received.

* * * * *